Patented May 8, 1945

2,375,268

UNITED STATES PATENT OFFICE 2,375,268

ORE TREATMENT AND CONCENTRATE PRODUCED THEREBY

Lewis B. Wyckoff, Lewiston, N. Y., assignor to Electro Metallurgical Company, a corporation of West Virginia No Drawing. Application June 26, 1942, Serial No. 448,607

6 Claims. (Cl. 75—31)

The invention relates to the treatment of ores and concentrates of titanium containing substantial proportions of iron and to titanium concentrates produced by such treatment.

The richest ore of titanium, rutile, consists substantially entirely of titanium dioxide ($TiO_2$). This ore is becoming so scarce and expensive that a satisfactory substitute for it is sought. There exist large deposits of other titanium ores, for example ilmenite and titaniferous iron ores, but such ores contain substantial proportions of oxydic iron and, for technical and economic reasons, are not well suited to the preparation of titanium or its alloys and compounds. Efforts have accordingly been made to remove substantially all of the iron from these materials and thereby to produce a titanium concentrate suitable for use as a substitute for rutile.

Nearly all of the methods that have been proposed for the treatment of titanium-rich materials containing oxydic iron compounds involve heating these materials with a mixture of carbon and a fluxing material to reduce the iron compounds and to form a titanium-rich slag. The fluxing materials commonly proposed are soda ash, silica, and lime. Titanium concentrates produced by such methods are generally unsatisfactory, particularly when they are to be used for the production of alloys by the conventional method, aluminothermic reduction. Thus, concentrates produced by the method using a soda ash flux require excess aluminum and heat to reduce and volatilize retained soda when the concentrates are smelted aluminothermically. Similar difficulty is encountered in the smelting of concentrates obtained using silica as a flux, and moreover, these concentrates yield alloys contaminated with silicon. If lime is used as a fluxing agent to prepare titanium-rich concentrates from iron-containing ores, the ore must be highly diluted with lime to secure a workable slag.

Thus, there is a demand for an efficient, economical process of preparing from iron-containing titanium ores a titanium-rich, substantially iron-free concentrate which may be used as an economical substitute for rutile in the preparation of titanium or alloys and compounds of that element by aluminothermic smelting as well as by other methods. It is the chief object of the present invention to satisfy this demand.

The invention, by the practice of which this object is achieved, comprises a method of treating iron-containing, titanium-rich materials, which method includes the step of smelting a charge of such material in a suitable furnace with a carbonaceous reducing agent such as coal, coke, or charcoal while fluxing the furnace charge with alumina and lime during the smelting operation. Also included in the invention is the titanium concentrate produced by this method.

In accordance with the invention, a titanium ore material containing oxydic iron compounds is mixed with carbonaceous material, alumina, and lime to form a furnace charge. Impurities such as magnesia and silica may be tolerated in the charge in minor amounts, the magnesia replacing lime. The ingredients of the furnace charge are so proportioned that when the charge is smelted, substantially all of the oxydic iron compounds in the ore material will be reduced to elemental iron and there will be produced a low-melting-point slag of sufficient fluidity to permit the molten iron globules to coalesce and to fall through it by gravity. The charge is smelted, molten iron and slag are produced and are separated one from the other. The slag, which is rich in titanium and contains little or no iron, may be then used as a raw material for the preparation of titanium or titanium alloys or compounds by known processes.

In practicing the invention, the amounts of alumina and lime used in the furnace charge are adjusted in accordance with the amount of titanium dioxide ($TiO_2$) present in the ore material to be concentrated. Suitably, for every one hundred parts of titanium dioxide in the charge about 2 to 21 parts (preferably between about 7 and 15 parts) of alumina and 7 to 29 parts (preferably between about 20 and 25 parts) of lime are used. In large scale tests, excellent results have been obtained using about 22 parts of lime and 10 parts of alumina per hundred parts of titanium dioxide. From these proportions it will be evident that the furnace charge contains lime and alumina in the aggregate amounting to not more than one-third of the titanium oxide in the charge by weight.

To form the furnace charge, the titanium ore material, lime, and alumina are preferably crushed and are thoroughly mixed with sufficient carbonaceous material to reduce substantially all of the iron oxide in the ore. The charge is then ready for smelting and is fed into a suitable furnace, desirably an electric furnace, where it is smelted. During smelting, the oxydic iron present in the charge is reduced to molten metallic iron, and a fluid slag is produced. The iron falls through the slag to form a pool beneath the slag and may be removed from the furnace separately from the slag.

The slag produced by the method of the invention is a titanium concentrate particularly well adapted to the preparation of titanium alloys by known aluminothermic smelting procedures. It generally contains about 2% to 15% alumina, 5% to 20% lime, the remainder substantially all titanium oxide, the maximum titanium oxide content being about 80%, calculated at $TiO_2$. When the method of the invention is conducted under the most preferred conditions, the titanium concentrate produced contains about 2.5% to 10% alumina, 14% to 17% lime, the remainder substantially all titanium oxide. Impurities in the concentrate usually do not exceed a total of 5%. Impurities may include silica, iron oxide, and magnesia. Less aluminum is required for treatment of the concentrate of the invention than is required for the treatment of concentrates produced by other methods. It is also well adapted to the preparation by known methods of titanium compounds for pigments or other products. The invention thus provides a titanium concentrate that is an effective substitute for rutile, being relatively free from iron although produced from a material containing substantial proportions of iron.

There is reason to believe that the slag produced by the invention contains a substantial proportion of titanium in a lower degree of oxidation than titanium dioxide, probably as $Ti_2O_3$ or $TiO$. The presence of such lower oxides is a decided advantage, particularly where it is desired to produce titanium alloys from the concentrate by aluminothermic smelting, because less aluminum is required for the reduction of these oxides than for the reduction of titanium dioxide. Thus, if a concentrate contains such lower oxides, less aluminum is required for the reduction of the concentrate per unit of contained titanium than would be required for the reduction of rutile, which is substantially entirely titanium dioxide.

The invention may be used advantageously to beneficiate titanium ores such as ilmenite, arizonite, pseudobrookite, and titaniferous iron ores and the like and may also be used to remove iron from slags containing oxydic compounds of both titanium and iron.

I claim:

1. The method of treating a material containing an oxydic compound of titanium and an oxydic compound of iron, which method comprises preparing a furnace charge containing said material, a quantity of a carbonaceous reducing agent sufficient to reduce substantially all of the iron oxide in said material, and a quantity of alumina and lime sufficient to flux said charge and to form, when said charge is smelted, a slag containing about 2% to 15% alumina, 5% to 20% lime, and 65% to 80% titanium oxide calculated as $TiO_2$; and smelting said charge in a furnace to produce molten iron and a fluid, titanium-rich slag of such composition.

2. The method of treating a material containing an oxydic compound of titanium and an oxydic compound of iron, which method comprises preparing a furnace charge containing said material, a carbonaceous reducing agent, alumina, and lime, so proportioned that the charge contains about 2 to 21 parts of alumina and 7 to 29 parts of lime per 100 parts of titanium oxide, and sufficient carbon to reduce substantially all of the iron oxide present in such material; and smelting said charge in a furnace to produce molten iron and a fluid, titanium-rich slag.

3. The method of treating a material containing an oxydic compound of titanium and an oxydic compound of iron, which method comprises preparing a furnace charge containing said material, a carbonaceous reducing agent, alumina, and lime, so proportioned that the charge contains about 7 to 15 parts of alumina and 20 to 25 parts of lime per 100 parts of titanium oxide, and sufficient carbon to reduce substantially all of the iron oxide present in such material; smelting said charge in a furnace to produce molten iron and a fluid, titanium-rich, substantially iron-free slag; and removing said molten iron from the furnace separately from said slag.

4. The method of treating a material containing an oxydic compound of titanium and an oxydic compound of iron, which method comprises preparing a furnace charge containing said material, a carbonaceous reducing agent, alumina, and lime, so proportioned that the charge contains about 10 parts of alumina and 22 parts of lime per 100 parts of titanium oxide, and sufficient carbon to reduce substantially all of the iron oxide present in such material; smelting said charge in a furnace to produce molten iron and a fluid, titanium-rich, substantially iron-free slag; and removing said molten iron from the furnace separately from said slag.

5. A titanium concentrate containing about 2% to 15% alumina, 5% to 20% lime, the remainder substantially all titanium oxide, the maximum titanium oxide content being about 80%, calculated as $TiO_2$.

6. A titanium concentrate containing about 2.5% to 10% alumina, 14% to 17% lime, the remainder substantially all titanium oxide.

LEWIS B. WYCKOFF.